Figure 8:
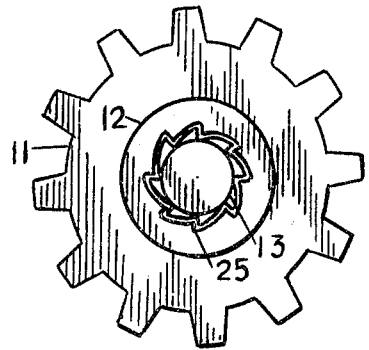

United States Patent [19]

Alvigini

[11] 4,108,459
[45] Aug. 22, 1978

[54] SPRING POWERED BICYCLE

[76] Inventor: Mario Filippo Alvigini, 217 W. 18th St., New York, N.Y. 10011

[21] Appl. No.: 782,533

[22] Filed: Mar. 29, 1977

[51] Int. Cl.² ............................................. B62M 1/04
[52] U.S. Cl. ..................................... 280/215; 74/142; 180/1 E; 185/39; 280/255; 280/258
[58] Field of Search ............... 280/212, 215, 253, 255, 280/258, 244, 246; 74/142, 126; 180/1 E; 185/39

[56] References Cited

U.S. PATENT DOCUMENTS

| 623,173 | 4/1899 | Noe | 280/258 |
| 688,979 | 12/1901 | Wold | 280/246 X |
| 1,798,971 | 3/1931 | Clements | 280/255 X |
| 2,653,037 | 9/1953 | Lassiter | 280/258 |
| 2,908,356 | 10/1959 | Daarud | 185/39 |

*Primary Examiner*—John P. Silverstrim

[57] ABSTRACT

A mechanism for a rider propelled vehicle having a frame and a ground engaging wheel mounted on it comprising two lever arms on opposite sides of frame, extending backwardly, with foot pedals on their extremities and mounted each on a cylindrical oscillating shaft on opposite sides of a drive wheel gear. When these lever arms are depressed by the rider they are spring biased upwards and set in motion the mechanism that via shafts and gears winds up a spiral spring mounted into a drum incorporated in the rear wheel of the vehicle. The spring unwinds on its outer end causing the drum to rotate forward and the drum to rotate the wheel journaled on it.

3 Claims, 13 Drawing Figures

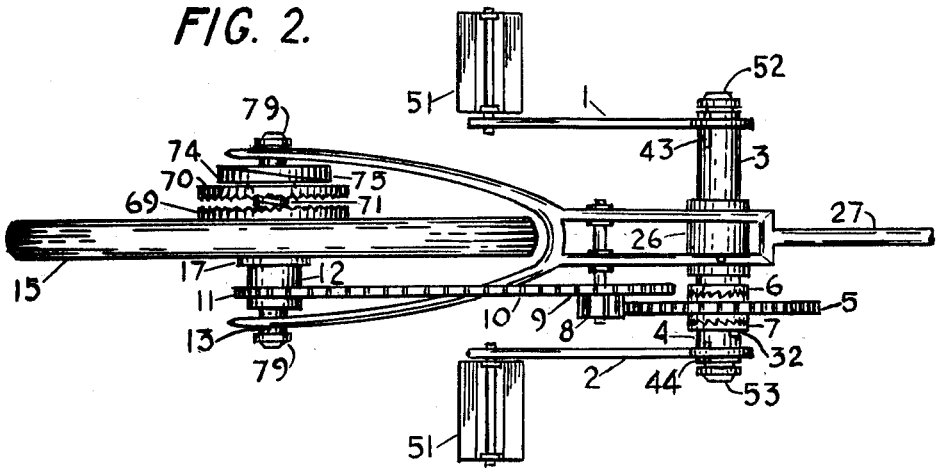
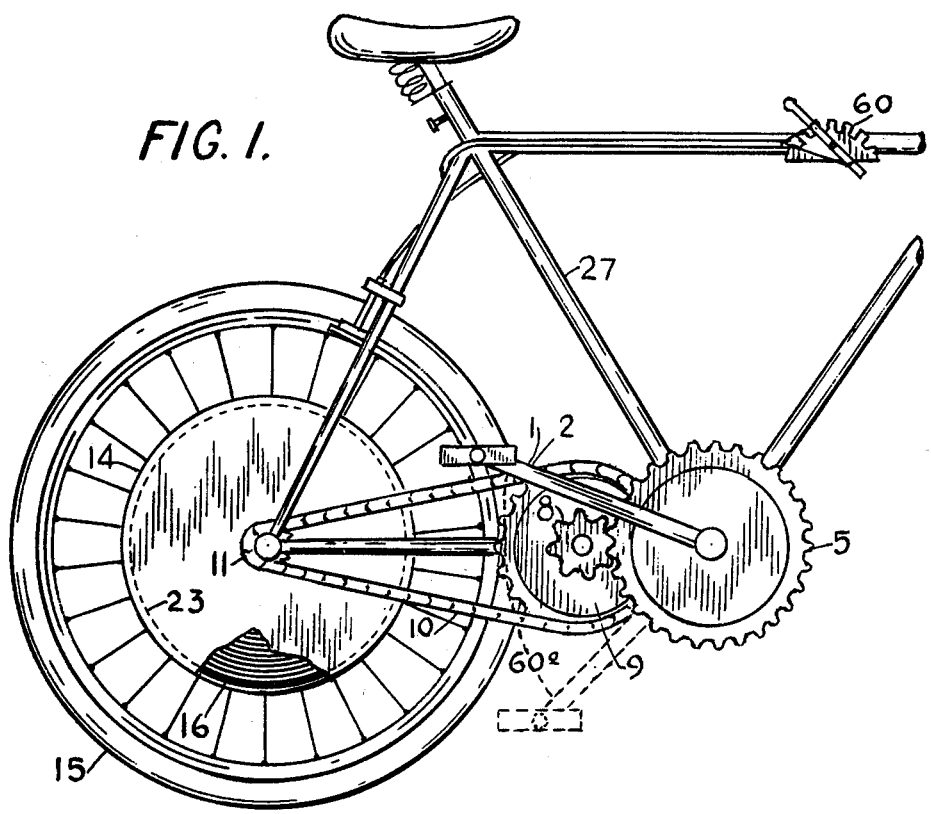

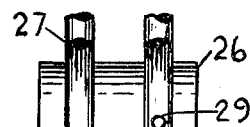
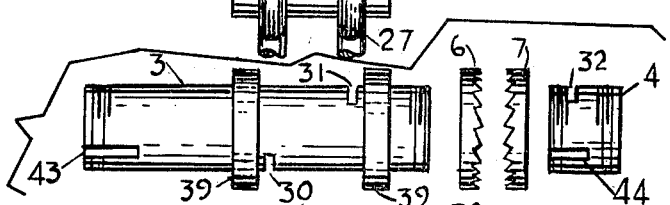
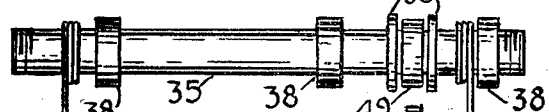
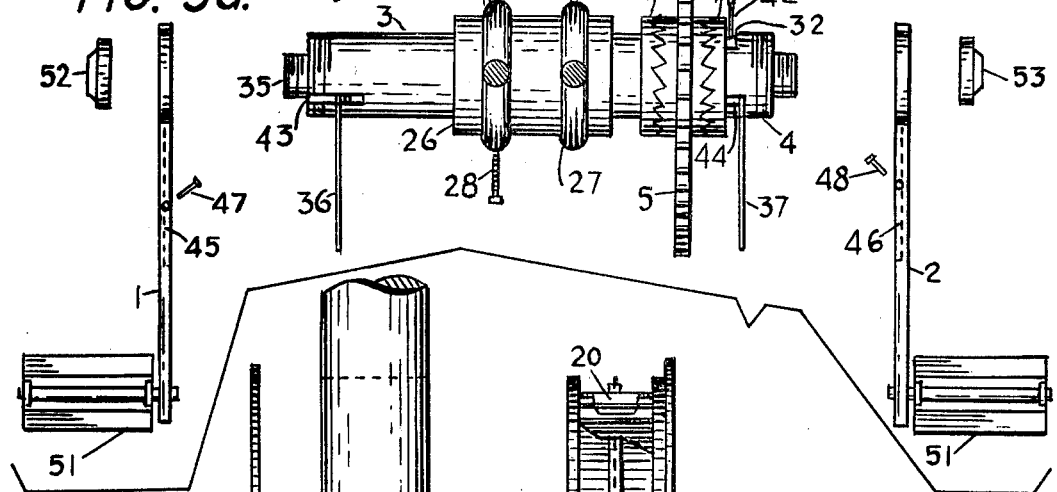
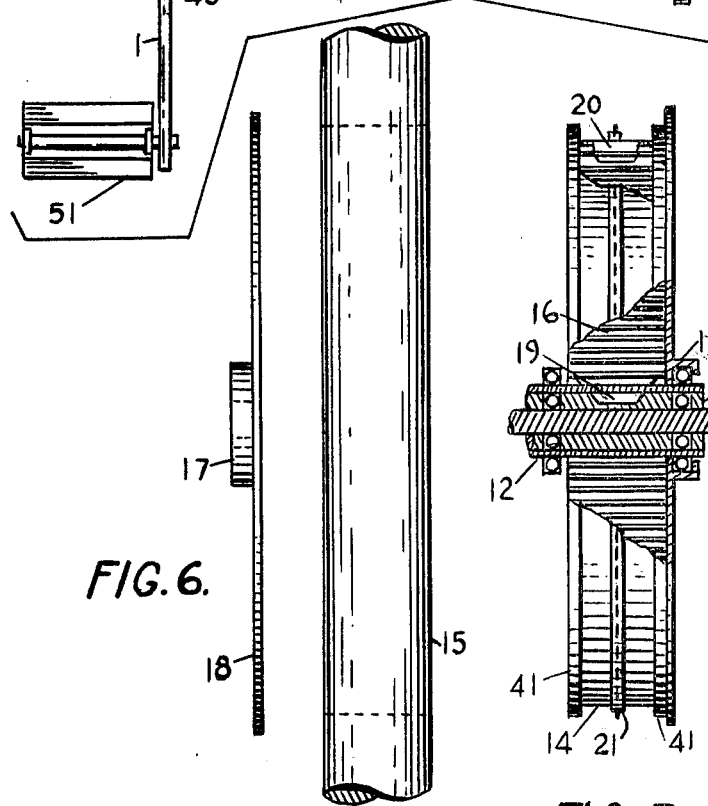
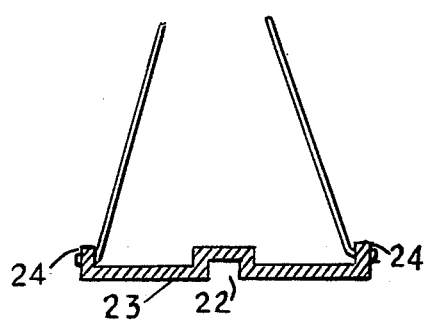

SPRING POWERED BICYCLE

BACKGROUND OF THE INVENTION

This invention consists of a bicycle with a new type of propulsion and a novel type of mechanism that includes a spring motor by which it is driven. It is designed for higher speed and minimal exertion for the rider. Its primary function is to permit the rider to wind up a spring with its weight and natural movements and to have then the spring drive the bicycle.

It is operated by a foot mechanism that utilizes exclusively the force of the weight and natural movements of the rider. Unlike the conventional bicycle it has no rotary type crank device but it is provided instead with lever arms mounted on oscillating shafts on opposite sides of the bicycle frame and projecting backwardly. On their extremities the lever arms have pedals projecting outwardly and adapted to receive the rider's feet. The rider can depress them by leaning om them simultaneously or alternately, in their complete span or in part of it. Each of them is provided with a spring which enables it to be released up whenever the pressure of the foot is relieved. When depressed they set in motion the mechanism that winds a spring mounted into a drum incorporated in the rear wheel of the bicycle. The spring unwinds on its outer end thus causing the spring drum to rotate and the spring drum rotates the wheel journaled on it. Speed variations can be obtained with an improved speed control device because driving power is continuously applied, without even the rider being aware of it. The simple, almost natural movements of the rider should provide a normal, comfortable ride; by leaning on the pedals in fast successive motions as if by walking lively a higher speed than that of conventional bicycle should be attained. The faster the spring winds up the faster it unwinds.

The structure of the bicycle frame may vary slightly from that of conventional bicycle to adapt the new mechanism that is hereinafter described. It comprises a saddle on its upper-rear portion; dual rear fork members extending diagonally from saddle to rear wheel and having slots to receive the axle of rear wheel; a diagonal bar extending slightly more forward than in conventional bicycle from saddle to its lower part where lever arms are mounted; a top horizontal bar extending from saddle to its front part; a diagonal member bar connecting front and lower portions of frame; dual member bars extending from convergence of diagonal bars, connecting upper rear and upper front portion of frame, to lower rear wheel fork members.

Brakes are the same as in conventional bicycle. Handle bars also are the same but are used by the rider exclusively for steering and balancing the body while in conventional bicycle handle bars are also used by the rider to help apply a more effective pedal pressure.

Object of this invention is to provide a pedal pressure, with the present drive assembly, that can be more effectively applied than in conventional bicycle.

Another objective of this invention is to provide a new lever action bicycle drive in which the two lever arms are operable simultaneously, alternately, in their complete span or in part of it, whereby the riding may be facilitated. Moreover the favorable radius of lever arm action facilitates the rider even more in applying power.

Another object of this invention is to provide a drive mechanism for a bicycle whereby the lever arms delivers power through a spur gear thus increasing the bicycle speed.

A further object of this invention is to develop a spring motor in which energy can be stored. This can give the rider a fast start by releasing energy stored in the spring. This spring motor can also provide the rider with a fast start by means of few downstrokes on one of the level arms when no energy in the spring is stored.

THE DRAWINGS

FIG. 1 - The front view of the external features of the mechanism.

FIG. 2 - The top view of the external features of the mechanism.

FIG. 3 - A view of the propulsion device showing its component parts and how they fit into each other.

FIG. 4 - A side view of a section of the ground engaging wheel where part of the mechanism is applied.

FIG. 5 - A side cross view of the spring drum showing spiral spring, drive shaft and fixed wheel axle in relation with each other.

FIG. 6 - A side view of the removable side wall of the spring drum.

FIG. 7 - A cross cut view showing the pattern of the inner rim of the ground engaging wheel.

FIG. 8 - Illustrates sprocket wheel mounted on drive shaft and said drive shaft in clutch connection with fixed wheel axle on which it is journaled.

Figure 9:
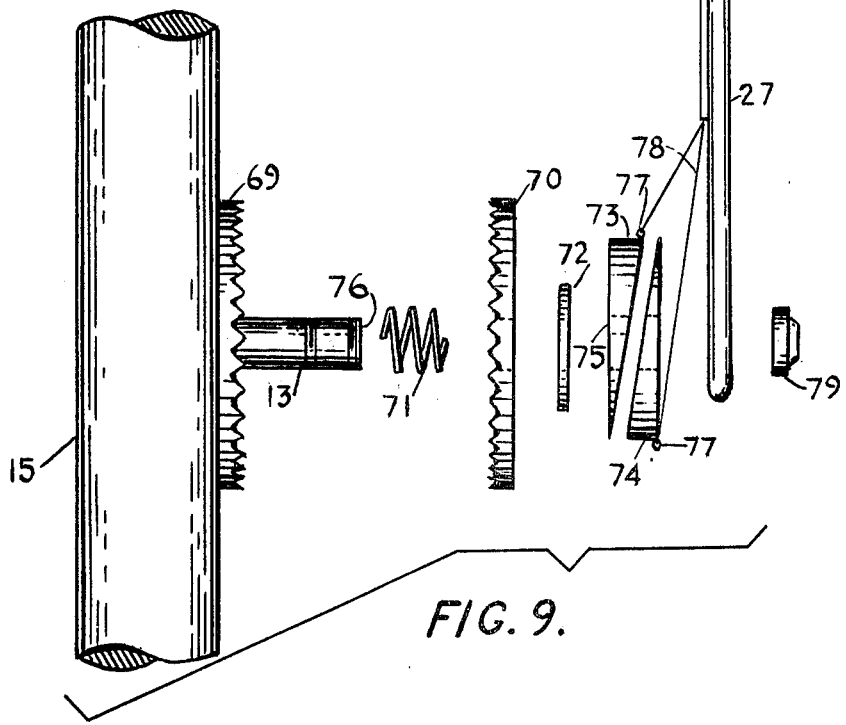

FIG. 9 - The component parts of the assembly for stopping the spring drum from rotating or decreasing its speed.

Figure 10:
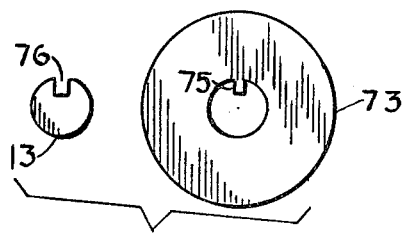

FIG. 10 - The front view of one of two pressure discs showing splite and front view of wheel axle showing slot where splite fits.

DESCRIPTION OF THE INVENTION

Referring again to the drawing, FIG. 1 shows the front view of the part of the vehicle on which the mechanism of this invention is applied. FIG. 2 shows the top view of the mechanism. Two lever arms 1-2 have a span of oscillation of about 60°. When depressed they partially rotate the cylindrical shafts on which they are mounted 3-4 and said shafts will cause a wheel gear 5, that is engaged to them by means of a one way clutch 6-7 to rotate counter clock-wise. The wheel gear is meshed with a spur gear 8 causing it to turn clock-wise. Said spur gear is connected with a first sprocket wheel 9 which engages, by means of a transmission chain 10, a second sprocket wheel 11 mounted on a drive shaft 12. Said drive shaft is journaled for rotation on a fixed wheel axle 13.

A spring drum 14, incorporated in the ground engaging wheel 15 is journaled for rotation on said drive shaft 12. Said spring drum is provided with a spiral spring 16 having its inner end secured to drive shaft 12 on which it is wound and its outer end secured to the outer periphery of spring drum 14.

Said spring drum is provided with collars 17 projecting outwardly from its side walls and extending over drive shaft 12. Under said collars said spring drum is journaled on drive shaft 12 for clock-wise rotation.

The spring drum 14 has circular side walls, one of which is removable 18 for insertion of spiral spring 16. The removable side wall is secured to cylindrical wall of spring drum 14 by bolts or other suitable fasteners while the other spring drum side wall may be riveted or welded to cylindrical wall.

Both side walls of spring drum 14 have a circumference wider than cylindrical wall in order to create side elevations within which the ground engaging wheel 15, journaled on said spring drum is contained.

The spiral spring 16 mounted in the spring drum 14 and wound about drive shaft 12 is secured to said drive shaft by means of a J shaped end coil (FIG. 5) being inserted into a suitable slot 19 on said drive shaft; the outer coil of said spiral spring being looped to a cog 20 provided on the inner face of the cylindrical wall of spring drum 14.

The turning action of the sprocket wheel 11 motivated by the foot action on lever arms 1-2 cause drive shaft 12 to rotate clock-wise and thus winding the spiral spring 16 mounted on it.

As the spiral spring 16 winds up, it also unwinds on its outer end fastened on the spring drum 14 causing said spring drum to turn clock-wise, and thus rotate the ground engaging wheel 15, journaled on it, in the same direction.

A free-wheeling clutch 21 is mounted on the outside face of spring drum 14 and has its matching section 22 secured on the inside face of the inner ring of the ground engaging wheel 15. The free-wheeling clutch enables the wheel to continue turning when the spring drum's drive motion is stopped and also enables said wheel to continue turning when its speed exceeds that of driving spring drum 14 thus allowing free coasting with said spring drum engaged.

The ground engaging wheel is provided on each side of its inner ring 23 with a collar 24 on which are secured spokes supporting its ground engaging part.

The drive shaft or spring arbor 12 is provided in its inner face with ratchet teeth 25 in engagement with ratchet teeth on the wheel axle 13 configured and positioned to allow clock-wise rotation of the drive shaft 12 in its winding action of the drum spring 16 and prevent its unwinding on the opposite side. (FIG. 8)

Numeral 26 the device's cylindrical housing secured to the bicycle's frame 27 by means of two fasteners 28-29.

Two cylindrical oscillating shafts 3-4 mount the two lever arms 1-2. Two radially extending slots 30-31 are formed on the oscillating shaft 3, and one radially extending slot 32 is formed on second oscillating shaft 4. There are two clutch section 6-7. Two tension springs 36-37 are mounted on fixed shaft 35. A drive wheel gear 5 engages a spur gear 8, a fixed shaft 35, and the two oscillating cylindrical shafts 3-4 journaled 38 on fixed shaft 35, on opposite sides of drive wheel gear 5, the cylindrical housing 26 journaled 39 on oscillating shaft 3, fastener means 28-29 extending through said housing and oscillating shaft 3 to secure said housing and said fixed shaft to bicycle frame 27 while allowing oscillating rotation of shaft 3 within said housing and said fixed shaft. One oscillating shaft 4 has fastener means 42 driven on fixed shaft 35 to allow it the same radius of oscillation of first said oscillating shaft 3.

Both oscillating shafts 3-4 have an additional slot 43-44 respectively to allow tension springs 36-37 to have their protruding ends to be inserted into slots 45-46 alongside lever arms 1-2 and secured by fasteners 47-48 respectively; their other ends being inserted into slots on fixed shaft 35.

The journal on which the wheel gear 5 is mounted 49 has one fastening ring on each side of it 50 mounted on fixed shaft 35 to prevent the wheel gear 5 from sliding laterally.

A foot pedal 51 is mounted on the rear portion of each said lever arms, the two caps 52, 53 holding the assembly together.

When the lever arms 1-2 are depressed the two tension springs 36-37 urge the clutch sections 6-7 in engagement with the wheel gear 5 and when the pressure on said lever arms is relieved said springs disengage said clutch sections to release the lever arms 1-2 to their idle position.

FIG. 4 shows a side section of the ground engaging wheel 15 in relation to drive spring drum 14 (FIG. 5).

FIG. 5 illustrates a side cross view of spring drum 14. Shows two collars provided on its side walls 17 under which said spring drum is journaled on drive shaft 12 and said drive shaft being journaled on fixed wheel axle 13 to allow rotation of spring drum 14 on drive shaft 12 independent of rotation of said drive shaft on said fixed wheel axle; the spiral spring 16 secured to drive shaft 12 by means of having its inner J shaped end coil inserted into a suitable slot 19 on said drive shaft and its outer end coil secured to spring drum 14 by being looped to a cog 20 provided on the inside face of the cylindrical wall of said spring drum; the free-wheeling clutch 21 adapted to engage its matching section 22 inserted in the inner ring of the ground engaging wheel. (FIG. 7)

FIG. 6 illustrates a side view of the removable side wall 18 of spring drum 14.

FIG. 7 is a cross cut view showing the pattern of the inner rim of the ground engaging wheel of vehicle 23, showing side elevations or collars 24 on which spokes supporting the outer rim of said wheel are secured; a center recess where the free-wheeling clutch section 22 is contained.

FIG. 8 is an illustration of sprocket wheel 11 mounted on drive shaft 12 and said drive shaft in clutch connection with fixed wheel axle 13 on which it is journaled.

FIG. 9 is a representation of the component parts of the device for stopping the spring drum 14 from rotating or controlling its rotating speed. One tension spring 71 is interposed between two matching gears 69 and 70. Gear 69 is fastened on spring drum 14 and gear 70 is mounted to slide on wheel axle 13 and engage said first gear 69 when pressed against it by pressure disc. A washer 72 is mounted between gear 70 and two pressure discs 73-74, cap 79 holding the assembly together. Disc 73 is provided with a spline 75 that fits into a slot on the wheel axle 13 to prevent said disc from revolving but not from sliding laterally on said wheel axle. Said pressure disc 74 is provided with screw shreads on its inside face matching screw shreads on wheel axle 13, configured to allow it part rotation for tightening and loosening it from the hand control lever 60 (FIG. 1). Said pressure disc 74 is also provided on its extremities with brackets 77 where cables 78 are fastened.

From the control lever 60, by means of one said cables, said pressure disc 74 can be tightened and thus urged to press against its matching disc 73 which in its turn presses one said gear 70 to engage its matching gear 69 fastened on spring drum 14. The amount of pressure exerted secures the desired rotating speed of drive spring drum 14 or the blocking of it. When the pressure is relieved the tension spring 71 sets the two said gears apart thus leaving the spring drum 14 to turn freely again.

FIG. 10. A front view of the above said first pressure disc 73 and fixed wheel axle 13 showing the spline 75 of which said disc is provided and supposed to fit into a slot 76 shown on said fixed wheel axle.

While this invention has been described with detailed reference to the drawings, the protection sought is to be limited only by the terms of the claims which follow.

I claim as my invention:

1. A propulsion assembly for a rider propelled vehicle having a frame and a ground engaging wheel mounted on said frame, said assembly comprising: a first sprocket wheel, means drivingly connecting said first sprocket wheel to said ground engaging wheel, a second sprocket wheel, a transmission chain drivingly interconnecting said first and second sprocket wheels, a spur gear drivingly connected to said second sprocket wheel, a drive wheel gear in meshing engagement with said spur gear, a fixed shaft, two cylindrical oscillating shafts journaled on said fixed shaft, on opposite sides of said drive wheel gear, respectively, a one way clutch interconnecting each of said oscillating shafts to said drive wheel gear, a cylindrical housing journaled on one of said oscillating shafts, two radially extending slots in said one oscillating shaft, fastener means extending through said slots to secure said housing and said fixed shaft to said frame while allowing rotation of said one oscillating shaft within said housing and on said fixed shaft, a lever arm mounted on each of said oscillating shafts, and a foot pedal on the rear portion of each said lever arm whereby said lever arm is depressed backwardly to drive said vehicle.

2. A propulsion assembly as set forth in claim 1, wherein said means drivingly connecting said first sprocket wheel to said ground engaging wheel comprises: a fixed wheel axle supported by vehicle frame, a drive shaft journaled for rotation on said fixed wheel axle, said first sprocket wheel being fixedly mounted on said drive shaft, clutch teeth in the inside face of said drive shaft in engagement with clutch teeth on said fixed wheel axle whereby said drive shaft may turn only in one direction; a spring drum journaled on said drive shaft, a spiral spring mounted in said drum and wound about said drive shaft, its inner end being secured on said drive shaft and its outer end being connected on cylindrical wall of said spring drum, said ground engaging wheel journaled on said spring drum, a free-wheeling clutch interconnecting said ground engaging wheel and said spring drum whereby said ground engaging wheel may be rotated by said rotating spring drum or may rotate with said spring drum stopped.

3. A propulsion assembly as set forth in claim 2 and further including means for selectively connecting said spring drum to said wheel axle comprising: a hand lever secured to vehicle frame, cables connecting said hand lever to a pressure disc mounted on said fixed wheel axle of ground engaging wheel and adapted for part rotation on said fixed wheel axle, a matching pressure disc mounted on said fixed wheel axle and provided with a splite fitting into a slot on said fixed wheel axle whereby said matching pressure disc may slide and not rotate on said fixed wheel axle when pressure on it is exerted; one gear mounted on said fixed wheel axle and adapted to slide laterally, a matching gear secured to said spring drum and adapted for toothed connection with said first gear whenever pressure is exerted from said hand lever and transmitted by one said cables to said first and second disc thereby pressing said first and second gear in toothed connection to decrease or block rotation of said spring drum; a tension spring mounted on said fixed wheel axle and interposed between said first and second gear to release said gears from toothed connection whenever pressure is relieved from said hand lever to resume normal rotation of said spring drum.

* * * * *